(12) United States Patent
Schotge et al.

(10) Patent No.: US 10,344,864 B2
(45) Date of Patent: Jul. 9, 2019

(54) SUCTION ROLL ASSEMBLY

(71) Applicant: Voith Patent GmbH, Heidenheim (DE)

(72) Inventors: Peer Schotge, Heidenheim (DE);
Susanne Berger, Herbrechtingen (DE);
Klaus Hermann, Giengen (DE);
Andreas Schäfer, Heidenheim (DE);
Daniel Gronych, Heidenheim (DE)

(73) Assignee: Voith Patent GmbH, Heidenheim (DE)

( * ) Notice: Subject to any disclaimer, the term of this patent is extended or adjusted under 35 U.S.C. 154(b) by 289 days.

(21) Appl. No.: 15/454,207

(22) Filed: Mar. 9, 2017

(65) Prior Publication Data
US 2017/0175331 A1    Jun. 22, 2017

Related U.S. Application Data

(60) Division of application No. 14/077,609, filed on Nov. 12, 2013, now Pat. No. 9,605,761, which is a
(Continued)

(30) Foreign Application Priority Data

May 13, 2011 (DE) .......................... 10 2011 075 806

(51) Int. Cl.
*D21F 3/10* (2006.01)
*F16J 15/16* (2006.01)
*D21G 9/00* (2006.01)

(52) U.S. Cl.
CPC ............... *F16J 15/16* (2013.01); *D21F 3/10* (2013.01); *D21G 9/0009* (2013.01)

(58) Field of Classification Search
CPC ....................................................... F16J 15/16
See application file for complete search history.

(56) References Cited

U.S. PATENT DOCUMENTS

| 4,184,145 A | 1/1980 | Fima |
| 4,497,493 A | 2/1985 | Sall et al. |

(Continued)

FOREIGN PATENT DOCUMENTS

| DE | 10 2004 059 028 A1 | 6/2006 |
| DE | 10 2009 000 371 A1 | 8/2010 |
| GB | 732554 A | 6/1955 |

OTHER PUBLICATIONS

Notice of Transfer of International Research Report and the Written Notice issued for International Searching Authority or Statement dated Jul. 13, 2012 for International Application No. PCT/EP2012/058874 (9 pages).

*Primary Examiner* — Vishal A Patel
(74) *Attorney, Agent, or Firm* — Taylor IP, P.C.

(57) ABSTRACT

A suction roll assembly for sealing at least one negative or positive pressure zone which adjoins a surface of the roll which is perforated and moves in a movement direction in a machine for making paper, tissue or cardboard, has at least one sealing element which lies opposite the moving surface and is arranged in a receptacle which can be moved to change the format of the negative or positive pressure zone. In order to simplify the adjustability of the receptacle in order to position the sealing element, there is a signal transmitter which is connected directly or indirectly to the sealing element and the signal of which can be received on that side of the moving surface which faces away from the sealing element.

16 Claims, 2 Drawing Sheets

Related U.S. Application Data continuation of application No. PCT/EP2012/058874, filed on May 14, 2012.

(56) References Cited

U.S. PATENT DOCUMENTS

| | | | |
|---|---|---|---|
| 4,585,379 A | 4/1986 | Nagayama et al. | |
| 5,345,829 A | 9/1994 | Yamauchi et al. | |
| 6,003,872 A | 12/1999 | Nord | |
| 6,174,414 B1* | 1/2001 | Theriault | D21F 3/10 162/277 |
| 6,454,904 B1* | 9/2002 | Hermans | D21F 1/48 162/205 |
| 6,615,639 B1 | 9/2003 | Heinzen | |
| 8,573,598 B2 | 11/2013 | Shover et al. | |
| 2004/0075218 A1 | 4/2004 | Heinen | |
| 2004/0232620 A1 | 11/2004 | Bock et al. | |
| 2005/0126732 A1* | 6/2005 | Gleason, Jr. | D21F 3/10 162/198 |

* cited by examiner

SUCTION ROLL ASSEMBLY

CROSS REFERENCE TO RELATED APPLICATIONS

This is a divisional application based upon U.S. non-provisional patent application Ser. No. 14/077,609, entitled "SEAL ASSEMBLY", filed Nov. 12, 2013, which is incorporated herein by reference. Patent application Ser. No. 14/077,609 was a continuation of PCT application No. PCT/EP2012/058874, entitled "SEAL ASSEMBLY", filed May 14, 2012.

BACKGROUND OF THE INVENTION

1. Field of the Invention

The present invention relates to a suction roll assembly for sealing at least one negative or positive pressure zone which adjoins a perforated surface which moves in a movement direction in a paper, tissue or cardboard machine.

2. Description of the Related Art

In practical applications seal assemblies of this type are used in the forming section as well as in the press section and/or the drying section of a respective paper machine, where they can be utilized in suction rolls or blow rolls.

Suction rolls of this type can, for example, be used as a pick-up suction roll or as a suction guide roll. There are applications wherein the paper, tissue or cardboard web—referred to in this document simply as a web—runs with or without support of fabrics or felts. The suction rolls comprise, as a rule, stationary inside suction boxes, which form for example adjustable zones with at least one pressure level. Sealing of the pressure- or vacuum zones in the direction of fabric travel and in the axial direction occurs through sealing elements which, if positionable, can be mounted in adjustable receptacles, for example so-called "format slides". The moving surface in this case is consistent with the inside surface of the roll shell and as a rule is curved circularly.

The sealing elements which, due to their elongated shape, are also referred to as sealing strips contact the roll shell at the edge of a positive or negative pressure zone in the axial direction as well as also in the circumferential direction and thereby seal the zone. The web is held in the circumferential region of the negative pressure zone on the roll circumference through suction bores in the roll shell. The suction chamber often serves to also extract moisture from the web.

A suction roll is known from DE 10 2009 000 371 A1 whose suction box format is changeable through sealing element receptacles which laterally limit the suction zone and which are adjustable axially as well as in circumferential direction.

In order to achieve high running time efficiency it is important, among other things, to ensure a stable web run. Nevertheless, in many, in particular in graphic paper machines, web run problems occur. Therefore, after separation from the felt, in other words lifting of the felt on one web side or lifting of the web edge off of the felt, an unstable paper edge or even a raised edge, manifests itself.

Tests have shown that the adjustment of the suction on the web with the suction rolls, in particular with the suction felt guide roll has a significant influence on the edge characteristics of the paper. In order to ensure an optimum vacuum build-up on the paper, the "format slides" on the suction felt guide rolls and the pick-up rolls must be adjusted precisely, in particular transverse to the direction of web travel, in other words axially.

In machines currently in use however, the exact position of the format slide relative to the paper edge is not known since the adjustment of the web width occurs earlier in the production sequence, at the former (edge seam) and is not in direct relation to the adjustment of the format slide. In order to establish the position, the web edge must be determined relative to a fixed point of the roll (for example the roll edge). Then, the relative distance of the format slide to the paper edge must be determined by means of the geometric design data of the roll. This process is time consuming and at the same time awkward. If during the life span of a felt, adjustments are made to the edge seam, then the web width changes and the relative format slide positions become increasingly obscure if the adjustment is not reacted to immediately.

What is needed in the art is to simplify the adjustability of the receptacle for positioning the sealing element of a suction roll.

SUMMARY OF THE INVENTION

The present invention provides a signal transmitter connected directly or indirectly with the sealing element of a suction roll assembly, the signal of which can be received on the side of the moving surface facing away from the sealing element. The term "direct or indirect" in this case is intended to state that the signal transmitter is connected directly with the sealing element or its retainer, or that additional components, for example linkages, are arranged between them. In each case however, together with a movement of the sealing element or respectively its receptacle, the signal transmitter should also be moved.

The fact that the signal is received on the side of the moving surface facing away from the sealing element has many advantages. This fact is described in further detail below with an example of a suction roll. The moving surface in this case corresponds to the inside wall of a perforated suction roll shell. If the signal transmitter is connected with the sealing element then it provides precisely the current position of the sealing element which, therefore, according to the present invention can also be determined outside the roll shell.

Sealing elements such as can be used for the present invention are known. They consist, for example, of strip shaped rubber graphite or fiber reinforced thermosetting plastics.

The term "signal" can be defined broadly. The signal may occur through electromagnetic radiation, acoustic transducers but also through fluid flows. It is important that it can pass through the roll shell, for example through the perforation, and that it can be received from the outside of the roll.

The signal transmitter is, for example, at least one light source such as a light beam. The signal transmitter is, therefore, a cost effective and simple component. The light beam, in other words the signal, can pass through the perforation and can be captured by the human eye without technical receivers.

The light source may, for example, be provided by a laser. The high intensity of the light beam and its concentration offers the advantage to be able to micrometer-precisely recognize the location of the laser inside the roll, and thereby also to be able to precisely determine the location of the sealing element connected with it.

As has been shown in trials, intensity of the light beam and its concentration further offer the great advantage that the light is clearly visible not only through the perforation, but also through the web and even through a potentially utilized felt. A web edge, for example, and a sealing element extending in the circumferential direction can thereby be precisely adjusted to each other.

Further, the signal transmitter may be arranged inside the sealing element. In this way the exact location of the sealing element can be determined directly and without relative spacing.

A bore is, for example, provided in the sealing element through which the signal can pass. The signal transmitter can therefore be accommodated at a certain depth in the sealing element. This is advantageous since the section above is generally subject to wear and tear due to friction on the inside wall of the shell. The signal transmitter is therefore located in a protected region.

At least the bore may, for example, be filled with a material which permits the signal to pass through. This prevents the bore from clogging with abraded materials or other dirt. In the case where the signal transmitter is a light source, a transparent synthetic glass could, for example, be used for this purpose. The term "at least" in this context is meant to indicate that also the entire sealing element could consist of a material which allows the signal to pass through.

Alternatively, it is feasible to provide the bore with a flushing device. A connection for a water supply could, for example, be provided. This flushing would provide the additional advantage that the gap at the sealing element to the shell is thereby lubricated and wear and tear on the sealing element would thus be reduced.

The receptacle may be movable through a servomotor. Such a servomotor could be an electrically driven motor driving a spindle or, for example, a hydraulic or pneumatic cylinder. This servomotor provides the advantage that the receptacle can be readjusted at any time without having to make a manual adjustment via a normally utilized spindle which is accessed from the outside or by even having to open up the roll.

Provision is made that the signal from the signal transmitter can be picked up by a receiving unit which is connected with a microprocessor. In the case where the signal transmitter is a light source this could be an optical sensor. In this manner continuous monitoring during production is possible to ascertain whether the desired position of the sealing element is being kept. If this is not the case, the microprocessor can issue a warning or may even ensure through control of a servomotor on a receptacle that the sealing element is moved into the correct position. In addition, an inadvertent wrapping of the roll with the web can be monitored, since the received signal would weaken or fluctuate during a wrap-up.

The signal transmitter, the receiving unit and the servomotor may be components of a closed control circuit. The personnel can then operate the paper machine in the region of the suction roll fully automated with a suitable microprocessor program which determines the upper limiting values for the distance between web edge and sealing element, depending on paper quality, moisture or weight of the web or additional parameters.

A seal assembly with a plurality of signal transmitters and possibly a corresponding number of receiving units is also to be covered by the present invention. It can be useful to equip the sealing elements with a plurality of signal transmitters, for example due to redundancy. Moreover, a plurality of signal transmitters can more easily consider both web edges or, respectively, additional sealing element locations.

BRIEF DESCRIPTION OF THE DRAWINGS

The above-mentioned and other features and advantages of this invention, and the manner of attaining them, will become more apparent and the invention will be better understood by reference to the following description of (an) embodiment(s) of the invention taken in conjunction with the accompanying drawing(s), wherein.

Corresponding reference characters indicate corresponding parts throughout the several views. The exemplification set out herein illustrates one embodiments of the invention and such exemplification is not to be construed as limiting the scope of the invention in any manner.

DETAILED DESCRIPTION OF THE INVENTION

Figure 2:
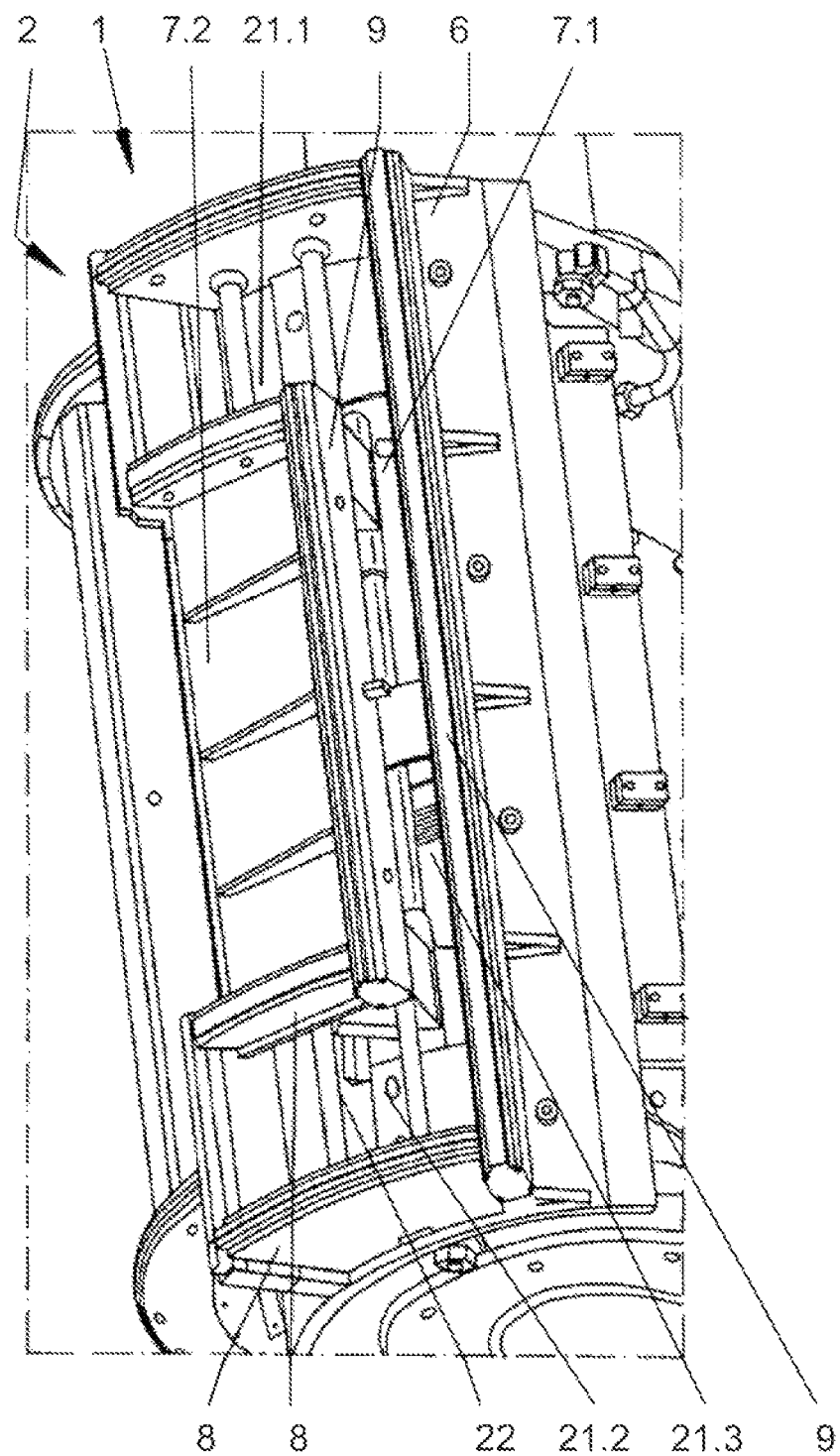
FIG. 2 illustrates a three-dimensional section of a suction roll according to the current state of the art, on which the perforated shell has been removed.

Referring now to the drawings, and more particularly to FIG. 2, it is noted that FIG. 2 serves the explanation of the problem which is the basis of the present invention and illustrates the interior of suction roll 2 with seal assembly 1. A perforated shell 3 which is not illustrated rotates around support 6 which includes all parts not rotating during operation. Negative pressure zones 7.1, 7.2, as well as all supply and outlet lines, and mechanical regulating devices are provided on support 6.

Suction roll 34 includes a first, at least substantially horseshoe-profiled or U-shaped suction zone 7.1 with two lateral suction zone sections 21.1, 21.2 as limbs, extending respectively generally in a roll circumference direction, and one suction zone section 21.3 connected with them, extending generally parallel to the roll axis. This first suction zone 7.1 can be provided as a high vacuum suction zone.

The format measured in the axial direction is variably adjustable through two lateral axially outer movable receptacles 8 which are movable, for example on rods 22, simultaneously or independent from each other. The remaining retainers are stationary retainers 9 for seal elements 10.

A holding zone 7.2 can be provided between suction zone sections 21.1 and 21.2.

As is known from DE 10 2009 000371 A1, additional movable receptacles 8 may be provided which are not illustrated here. These can also be arranged to pivot around the roll axis so that a different length of an under pressure zone 7.1, 7.2 can be achieved in the direction of movement 25 of the shell. Moreover, an additional suction zone may be provided following first suction zone 7.1, viewed in the circumferential direction.

Figure 1:
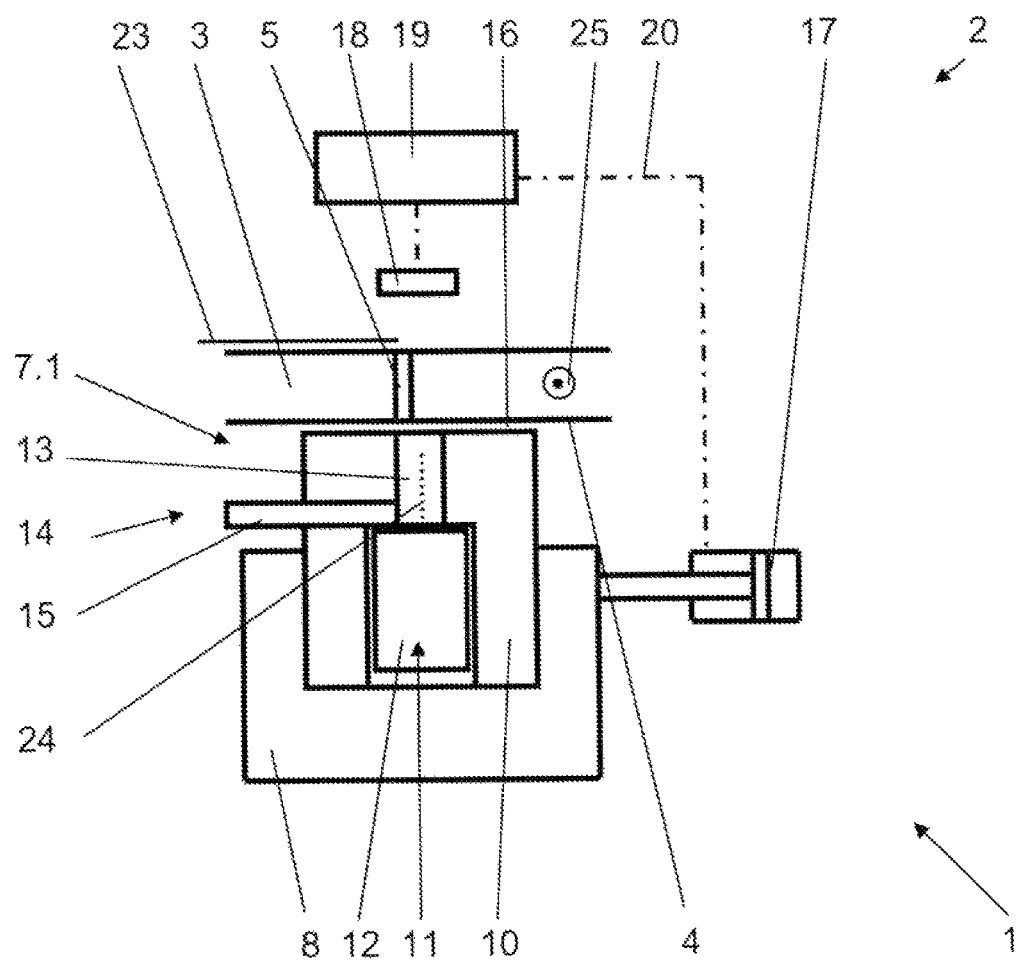
FIG. 1 is a schematic example of a seal assembly according to the present invention with an optical signal transmitter.

Up to this point the description of FIG. 1 of a suction roll 2 with a seal assembly 1 corresponds to the current state of the art, whereby the edge of a web cannot necessarily be allocated to the position of a sealing element.

In order to explain the present invention which eliminates this shortcoming, FIG. 1 needs to be considered, which has schematically assumed the main components of FIG. 2 which are essential for the present invention and which in addition illustrates the features according to the present invention.

One can see the seal assembly 1 with shell 3 moving in the direction of movement 25 (arrow pointing away from sheet plane). The inside wall represents moving surface 4 which is part of the present invention. Shell 3 is equipped with suction bores 5, only one of which is illustrated for the sake of clarity. The suction bores hold the web on the outer roll shell, as well as supply air and moisture into under pressure zone 7.1.

In a purely schematic depiction, movable receptacle 8 is illustrated U-shaped. It accommodates sealing element 10 consisting of rubber graphite. Light source 12 in the form of a laser is inserted in the lower region of sealing element 10. The emitted light beam 24 is indicated by a dotted line. (In other embodiments another electromagnetic radiation, an acoustic sound or a particle beam could also be emitted). The light beam passes through rotating shell 3 intermittently, in other words always exactly at an oppositely located suction bore. An observer therefore knows exactly where the seal element is located and can determine the position relative to the edge of web 23. If required, receptacle 8 of seal element 10 can easily be readjusted at the desired location. This occurs, for example through a servomotor 17.

This process can however also be automated and regulated if receiving unit 18 (in this embodiment where the signal transmitter 11 is light source 12, in other words a light-sensitive sensor) is used. The signals of receiving unit 18 can be evaluated by microprocessor 19 and appropriate positioning commands be transmitted to servomotor 17. Signal line 20 for this is indicated by a dashed-dotted line.

Laser 12 is arranged in the lower region of sealing element 10, so that it is not affected by wear and tear at moving surface 4 of shell 3. The light beam therefore passes through a bore 13. Bore 13 can be filled, for example with an acrylic, in other words with a material which is permeable to the signal, in this case light. This avoids dirt build up in bore 13. Bore 13 can alternatively also be provided with flushing device 14. Water, for example is thereby supplied through supply line 15 into the bore where it discharges again in seal gap 16. This provides the additional positive effect that a hydrostatic lubrication is established between seal element 10 and moving surface 4.

While this invention has been described with respect to at least one embodiment, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

COMPONENT IDENTIFICATION LIST 1 seal assembly
2 suction roll
3 shell
4 moving surface
5 suction bore
6 support
7.1, 7.2 under pressure zone (or over pressure zone)
8 movable receptacle
9 stationary retainer
10 sealing element
11 signal transmitter
12 light source, laser
13 bore in seal element
14 flushing device
15 supply line
16 seal gap
17 servomotor, cylinder
18 receiver
19 microprocessor
20 signal line
21.1, 21.2, 21.3 suction zone section
22 rod
23 web
24 light beam
25 direction of movement

What is claimed is:

1. A suction roll assembly, comprising:
a suction roll having a perforated moving surface; and
a seal assembly for sealing at least one negative pressure zone adjoining the perforated moving surface of the suction roll and moving in a movement direction, the suction roll having a longitudinal axis and a radial axis perpendicular to the longitudinal axis, the seal assembly including:
a receptacle movable to change a format of the negative pressure zone or the positive pressure zone;
at least one sealing element located opposite said moving surface, said at least one sealing element being arranged in said receptacle; and
a signal transmitter enclosed by said receptacle and said at least one sealing element, a signal from said signal transmitter being receivable on a side of said moving surface facing away from said at least one sealing element, said signal transmitter being arranged so that said signal at least partially passes through some of the perforations of the perforated moving surface, the signal being a light or laser.

2. The suction roll assembly of claim 1, wherein said signal transmitter is an electrical signal transmitter, the signal from said electrical signal transmitter passing through the perforations of the perforated surface and being received by a human eye or a receiving unit positioned on a side of said perforated moving surface opposite of a location of the electrical signal transmitter, wherein said signal is indicative of the current position of the sealing element parallel to the longitudinal axis of the suction roll.

3. The suction roll assembly according to claim 1, wherein said signal transmitter is arranged inside said at least one sealing element.

4. The suction roll assembly according to claim 1, further comprising a bore in said at least one sealing element, said bore being arranged such that said signal can pass through said bore.

5. The suction roll assembly according to claim 4, wherein said bore is at least one bore filled with a material permeable to said signal.

6. The suction roll assembly according to claim 1, further comprising a servomotor coupled to said receptacle, said receptacle being movable by the servomotor.

7. The suction roll assembly according to claim 6, further comprising a receiving unit connected with a microprocessor, said signal from said signal transmitter being capable of being picked up by said receiving unit.

8. The suction roll assembly according to claim 7, wherein said signal transmitter, said receiving unit and said servomotor are components of a closed control circuit.

9. A fibrous web machine, comprising:
a suction roll assembly including:
a suction roll having a perforated moving surface upon which a fibrous web travels; and
a seal assembly for sealing at least one negative pressure zone adjoining the perforated moving surface of the suction roll and moving in a movement direction, the suction roll having a longitudinal axis and a radial axis perpendicular to the longitudinal axis, the seal assembly including:

a receptacle movable to change a format of the negative pressure zone or the positive pressure zone;

at least one sealing element located opposite said moving surface, said at least one sealing element being arranged in said receptacle; and a signal transmitter enclosed by said receptacle and said at least one sealing element, a signal from said signal transmitter being receivable on a side of said moving surface facing away from said at least one sealing element, said signal transmitter being arranged so that said signal at least partially passes through some of the perforations of the perforated moving surface, the signal being a light or laser.

10. The suction roll assembly of claim 9, wherein said signal transmitter is an electrical signal transmitter, the signal from said electrical signal transmitter passing through the perforations of the perforated surface and being received by a human eye or a receiving unit positioned on a side of said perforated moving surface opposite of a location of the electrical signal transmitter, wherein said signal is indicative of the current position of the sealing element parallel to the longitudinal axis of the suction roll.

11. The fibrous web machine according to claim 9, wherein said signal transmitter is arranged inside said at least one sealing element.

12. The fibrous web machine according to claim 9, further comprising a bore in said at least one sealing element, said bore being arranged such that said signal can pass through said bore.

13. The fibrous web machine according to claim 12, wherein said bore is at least one bore filled with a material permeable to said signal.

14. The fibrous web machine according to claim 13, said at least one bore further including a flushing device.

15. The fibrous web machine according to claim 9, said receptacle being movable by a servomotor.

16. The fibrous web machine according to claim 15, further comprising a receiving unit connected with a microprocessor, said signal from said signal transmitter being capable of being picked up by said receiving unit.

* * * * *